(12) United States Patent
Lee et al.

(10) Patent No.: US 8,345,865 B2
(45) Date of Patent: Jan. 1, 2013

(54) BLOCK CIPHER ARIA SUBSTITUTION APPARATUS AND METHOD

(75) Inventors: Sang-Woo Lee, Daejeon (KR); Yong-Sung Jeon, Daejeon (KR); Seungmin Lee, Daejeon (KR); Donghyuk Lee, Daejeon (KR); Taek Yong Nam, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 832 days.

(21) Appl. No.: 12/176,649

(22) Filed: Jul. 21, 2008

(65) Prior Publication Data

US 2009/0161864 A1    Jun. 25, 2009

(30) Foreign Application Priority Data

Dec. 20, 2007    (KR) .................. 10-2007-0134064

(51) Int. Cl.
*H04K 1/10*    (2006.01)
(52) U.S. Cl. ........................................ 380/37; 380/42
(58) Field of Classification Search .............. 380/37, 380/28, 29, 44, 36; 713/189, 150, 168
See application file for complete search history.

(56) References Cited

U.S. PATENT DOCUMENTS

| | | | |
|---|---|---|---|
| 5,687,238 A | | 11/1997 | Shimada |
| 7,043,016 B2 * | | 5/2006 | Roelse .......................... 380/29 |
| 7,502,464 B2 * | | 3/2009 | Macchetti et al. .............. 380/37 |
| 7,809,135 B2 * | | 10/2010 | Johnson et al. ................. 380/44 |
| 7,873,161 B2 * | | 1/2011 | Sexton ........................... 380/28 |
| 7,933,403 B2 * | | 4/2011 | Lee et al. ........................ 380/28 |
| 7,970,129 B2 * | | 6/2011 | Trichina ......................... 380/28 |
| 8,050,401 B2 * | | 11/2011 | Kohnen ......................... 380/28 |
| 8,094,815 B2 * | | 1/2012 | Koo et al. ....................... 380/29 |
| 8,122,075 B2 * | | 2/2012 | Watanabe et al. ............. 708/250 |
| 2002/0027987 A1 | | 3/2002 | Roelse |

(Continued)

FOREIGN PATENT DOCUMENTS

KR    8-179690 A    7/1996

(Continued)

OTHER PUBLICATIONS

Johannes Wolkerstorfer, Elisabeth Oswald and Mario Lamberger, "An ASIC Implementation of the AES SBoxes"; Topics in Cryptology—CT-RSA 2002 Lecture Notes in Computer Science, 2002, vol. 2271/2002, 29-52 [retrieved from SpringerLink database on Nov. 21, 2011].*

(Continued)

*Primary Examiner* — Saleh Najjar
*Assistant Examiner* — Lashanya Nash
(74) *Attorney, Agent, or Firm* — Fenwick & West LLP

(57) ABSTRACT

A block cipher ARIA substitution apparatus, the apparatus includes a first Sbox operation unit for performing operations of a substitution box $S_1$ and a substitution box $S_1^{-1}$; a second Sbox operation unit for performing operations of a substitution box $S_2$ and a substitution box $S_2^{-1}$; and a control unit for determining modes of the first Sbox operation unit and the second Sbox operation unit. The first Sbox operation unit has a first inverse affine transformation unit for performing an inverse affine operation for obtaining $S_1^{-1}$; a finite field inverse element operation unit for computing an inverse element of $GF(2^8)$ or a result value of the first inverse affine transformation unit; a first affine transformation unit for performing an affine operation for obtaining $S_1$; and a first and a second multiplexer.

6 Claims, 8 Drawing Sheets

U.S. PATENT DOCUMENTS

| | | | |
|---|---|---|---|
| 2004/0184602 A1* | 9/2004 | Nadehara | 380/28 |
| 2005/0271204 A1* | 12/2005 | Chu | 380/44 |
| 2005/0283714 A1* | 12/2005 | Korkishko et al. | 714/781 |
| 2006/0002548 A1* | 1/2006 | Chu | 380/28 |
| 2008/0285745 A1* | 11/2008 | Teglia et al. | 380/29 |

FOREIGN PATENT DOCUMENTS

| | | |
|---|---|---|
| KR | 1020070021883 A | 2/2007 |
| KR | 1020070060882 A | 6/2007 |
| KR | 10-0786391 B1 | 12/2007 |

OTHER PUBLICATIONS

Fuh-ke Chang; Wei-Chun Hsu; Chien-Ching Lin; Hsie-Chia Chang; "Design and implementation of a reconfigurable architecture for (528, 518) Reed-Solomon codec IP" IEEE-NEWCAS Conference, 2005. The 3rd International. Jun. 19-22, 2005; pp. 87-90 [retrieved from IEEE database on Mar. 12, 2012].*

Bonseok Koo, Gwonho Ryu, Taejoo Chang, and Sangjin Lee, "Design and Implementation of Unified Hardware for 128-Bit Block Ciphers ARIA and AES," ETRI Journal, vol. 29, No. 6, pp. 820-822, Dec. 2007. [retrieved on Jun. 25, 2012 from Internet "http://etrij.etri.re.kr/Cyber/Download/PublishedPaper/2906/S29-06-15.pdf" ].*

Sangwoon Yang, Jinsub Park and Younggap You, "The Smallest ARIA Module with 16-Bit Architecture", Information Security and Cryptology—ICISC 2006 Lecture Notes in Computer Science, 2006, vol. 4296/2006, pp. 107-117, [retrieved on Jun. 25, 2012 from SpringerLink database].*

* cited by examiner

FIRST SUBSTITUTION UNIT (100)

SECOND SUBSTITUTION UNIT (102)

FIG.5A

B[0]=A[0] xor A[4] xor A[5] xor A[6] xor A[7] xor '1'
B[1]=A[1] xor A[5] xor A[6] xor A[7] xor A[0] xor '1'
B[2]=A[2] xor A[6] xor A[7] xor A[0] xor A[1]
B[3]=A[3] xor A[7] xor A[0] xor A[1] xor A[2]
B[4]=A[4] xor A[0] xor A[1] xor A[2] xor A[3]
B[5]=A[5] xor A[1] xor A[2] xor A[3] xor A[4] xor '1'
B[6]=A[6] xor A[2] xor A[3] xor A[4] xor A[5] xor '1'
B[7]=A[7] xor A[3] xor A[4] xor A[5] xor A[6]

FIG.5B

B[0]=A[2] xor A[5] xor A[7] xor '1'
B[1]=A[0] xor A[3] xor A[6]
B[2]=A[1] xor A[4] xor A[7] xor '1'
B[3]=A[0] xor A[2] xor A[5]
B[4]=A[1] xor A[3] xor A[6]
B[5]=A[2] xor A[4] xor A[7]
B[6]=A[0] xor A[3] xor A[5]
B[7]=A[1] xor A[4] xor A[6]

FIG. 7A

B[0]=A[1] xor A[3] xor A[5] xor A[6] xor A[7]
B[1]=A[2] xor A[3] xor A[4] xor A[5] xor A[6] xor A[7] xor '1'
B[2]=A[0] xor A[1] xor A[2] xor A[4] xor A[5] xor A[7]
B[3]=A[0] xor A[1] xor A[6] xor A[7]
B[4]=A[1] xor A[6] xor A[7]
B[5]=A[0] xor A[1] xor A[4] xor A[5] xor A[6] xor '1'
B[6]=A[1] xor A[2] xor A[6] xor A[7] xor '1'
B[7]=A[0] xor A[1] xor A[2] xor A[3] xor A[5] xor A[6] xor '1'

FIG. 7B

B[0]=A[3] xor A[4]
B[1]=A[2] xor A[5] xor A[6]
B[2]=A[4] xor A[6] xor 1'b1
B[3]=A[0] xor A[1] xor A[2] xor A[6] xor A[7] xor '1'
B[4]=A[0] xor A[1] xor A[2] xor A[4] xor A[5]
B[5]=A[1] xor A[2] xor A[4] xor A[6] xor A[7] xor '1'
B[6]=A[0] xor A[2] xor A[3] xor A[4] xor A[5] xor A[7]
B[7]=A[0] xor A[3] xor A[6] xor A[7]

US 8,345,865 B2

BLOCK CIPHER ARIA SUBSTITUTION APPARATUS AND METHOD

CROSS-REFERENCE(S) TO RELATED APPLICATIONS

The present invention claims priority of Korean Patent Application No. 10-2007-0134064, filed on Dec. 20, 2007, which is incorporated herein by reference.

FIELD OF THE INVENTION

The present invention relates to an apparatus for encrypting or decrypting an Academy, Research Institute, and Agency (ARIA) block; and, more particularly, to a block cipher ARIA substitution apparatus and method which is capable of reducing the size of hardware of an ARIA encryption apparatus by implementing a block cipher ARIA substitution operation with a finite field operation without a specific ROM and/or RAM, and of performing a high-speed ARIA operation by implementing a substitution box by an operation logic such that a pipe line method is applicable.

This work was supported by the IT R&D program of MIC/IITA. [2007-S-021-01, Development of Integrated Security Technology for Personal Information Database]

BACKGROUND OF THE INVENTION

An ARIA algorithm for encrypting or decrypting is a symmetric key block cipher algorithm that has been developed by the Korean National Security Research Institute (NSRI) for the public and private use. In the ARIA algorithm, it is recommended that the number of rounds is twelve for a 128-bit length key, fourteen for a 192-bit length key, and sixteen for a 256-bit length key.

In the ARIA algorithm, encryption/decryption is performed by a round operation, and each round includes a substitution operation and a diffusion operation.

A time consumed for and a hardware resource used for an ARIA block encryption/decryption operation vary in accordance with a method for performing the substitution operation and the diffusion operation and a method for performing a key expansion process, and are directly associated with performance of an ARIA encryption process.

FIG. 1 is a view showing a conventional substitution unit. The substitution unit substitutes a 128-bit input with a result value of a substitution box in the unit of a byte. As shown in FIG. 2, the substitution box includes four types of boxes $S_1$ 200, $S_2$ 204, $S_1^{-1}$ 202, and $S_2^{-1}$ 206. The boxes $S_1^{-1}$ 202 and $S_2^{-1}$ 206 are inverse substitution boxes of $S_1$ and $S_2$, respectively. A first substitution unit 100 of FIG. 1 is used for an odd-numbered round operation and a second substitution unit 102 of FIG. 1 is used for an even-numbered round operation.

FIG. 2 is a view showing the four types of conventional substitution boxes. The substitution boxes 200, 202, 204 and 206 are four types of tables having values described in the ARIA algorithm, each of which stores the values in a storage unit such as a ROM in the form of a table and outputs a value (8 bits) of a table corresponding to a given 8-bit input value, that is, an address.

One substitution box requires a 256-byte ROM and the four types of substitution boxes are composed of a 1024-byte ROM. In order to construct the first substitution unit 100 of FIG. 1, a parallel process should be performed with respect to a 128-bit input. Thus, a 4096-byte ROM is required. In addition, in order to construct the second substitution unit 102 of FIG. 1, a parallel process should be performed with respect to a 128-bit input. Thus, a 4096-byte ROM is required. Consequently, an 8192-byte ROM is required for constructing the above-described substitution units.

As described above, since the ROM or the RAM should be included in order to construct the four types of substitution boxes in the prior art, the size of hardware is increased. In addition, since an access time to the ROM or the RAM is fixed, it is difficult to realize a high-speed operation.

SUMMARY OF THE INVENTION

It is, therefore, a primary object of the present invention to provide a block cipher ARIA substitution apparatus and method which is capable of reducing the size of hardware of an ARIA encryption apparatus by implementing a block cipher ARIA substitution operation via a finite field operation without a specific ROM and/or RAM, in ARIA block encryption.

It is another object of the present invention to provide a block cipher ARIA substitution apparatus and method which is capable of performing a high-speed ARIA operation by implementing a substitution box by an operation logic such that a pipe line method is applicable, in the ARIA block encryption.

In accordance with one aspect of the present invention, there is provided a block cipher ARIA substitution apparatus, the apparatus including: a first Sbox operation unit for performing operations of a substitution box $S_1$ and a substitution box $S_1^{-1}$; a second Sbox operation unit for performing operations of a substitution box $S_2$ and a substitution box $S_2^{-1}$; and a control unit for determining modes of the first Sbox operation unit and the second Sbox operation unit.

The first Sbox operation unit may include a first inverse affine transformation unit for performing an inverse affine operation for obtaining an inverse substitution box $S_1^{-1}$ with respect to an input value; a finite field inverse element operation unit for computing an inverse element of $GF(2^8)$ with respect to the input value or a result value of the first inverse affine transformation unit, which is multiplexed with the input value; a first affine transformation unit for performing an affine operation for obtaining a substitution box $S_1$ with respect to a result value of the finite field inverse element operation unit; a first multiplexer for determining an input of the finite field inverse element operation unit under control of the control unit; and a second multiplexer for selecting any one of the output value of the first affine transformation unit and the result value of the finite field inverse element operation unit as a result value of the first Sbox operation unit under the control of the control unit.

Preferably, the finite field inverse element operation unit has a finite field inverse element operation logic for an irreducible polynomial m(x) expressed by an equation of $m(x) = x^8 + x^4 + x^3 + x + 1$.

It is preferable that the first affine transformation unit outputs output values B[0] to B[7] satisfying a following equation with respect to input values A[0] to A[7], B[0]=A[0] xor A[4] xor A[S] xor A[6] xor A[7] xor '1',
B[1]=A[1] xor A[5] xor A[6] xor A[7] xor A[0] xor '1',
B[2]=A[2] xor A[6] xor A[7] xor A[0] xor A[1],
B[3]=A[3] xor A[7] xor A[0] xor A[1] xor A[2],
B[4]=A[4] xor A[0] xor A[1] xor A[2] xor A[3],
B[5]=A[5] xor A[1] xor A[2] xor A[3] xor A[4] xor '1',
B[6]=A[6] xor A[2] xor A[3] xor A[4] xor A[5] xor '1',
B[7]=A[7] xor A[3] xor A[4] xor A[5] xor A[6]

Further, it is preferable that the first inverse affine transformation unit outputs output values B[0] to B[7] satisfying a following equation with respect to input values A[0] to A[7], B[0]=A[2] xor A[5] xor A[7] xor '1',
B[1]=A[0] xor A[3] xor A[6],
B[2]=A[1] xor A[4] xor A[7] xor '1',
B[3]=A[0] xor A[2] xor A[5],
B[4]=A[1] xor A[3] xor A[6],
B[5]=A[2] xor A[4] xor A[7],
B[6]=A[0] xor A[3] xor A[5],
B[7]=A[1] xor A[4] xor A[6].

The second Sbox operation unit may include a second inverse affine transformation unit for performing an inverse affine operation for obtaining an inverse substitution box $S_2^{-1}$ with respect to an input value; a finite field inverse element operation unit for computing an inverse element of $GF(2^8)$ with respect to the input value or a result value of the second inverse affine transformation unit, which is multiplexed with the input value; a second affine transformation unit for performing an affine operation for obtaining a substitution box $S_2$ with respect to a result value of the finite field inverse element operation unit; a third multiplexer for determining an input of the finite field inverse element operation unit under control of the control unit; and a fourth multiplexer for selecting any one of the output value of the second affine transformation unit and the result value of the finite field inverse element operation unit as the result value of the second Sbox operation unit under the control of the control unit.

Further, the finite field inverse element operation unit may have a finite field inverse element operation logic for an irreducible polynomial m(x) expressed by an equation of $m(x)=x^8+x^4+x^3+x+1$.

It is preferable that the second affine transformation unit outputs output values B[0] to B[7] satisfying a following equation with respect to input values A[0] to A[7],
B[0]=A[1] xor A[3] xor A[5] xor A[6] xor A[7],
B[1]=A[2] xor A[3] xor A[4] xor A[5] xor A[6] xor A[7] xor '1',
B[2]=A[0] xor A[1] xor A[2] xor A[4] xor A[5] xor A[7],
B[3]=A[0] xor A[1] xor A[6] xor A[7],
B[4]=A[1] xor A[6] xor A[7],
B[5]=A[0] xor A[1] xor A[4] xor A[5] xor A[6] xor '1',
B[6]=A[1] xor A[2] xor A[6] xor A[7] xor '1',
B[7]=A[0] xor A[1] xor A[2] xor A[3] xor A[5] xor A[6] xor '1'.

Further, it is preferable that the second inverse affine transformation unit outputs output values B[0] to B[7] satisfying a following equation with respect to input values A[0] to A[7],
B[0]=A[3] xor A[4],
B[1]=A[2] xor A[5] xor A[6],
B[2]=A[4] xor A[6] xor 1'b1,
B[3]=A[0] xor A[1] xor A[2] xor A[6] xor A[7] xor '1',
B[4]=A[0] xor A [1] xor A[2] xor A[4] xor A[5],
B[5]=A[1] xor A[2] xor A[4] xor A[6] xor A[7] xor '1',
B[6]=A[0] xor A[2] xor A[3] xor A[4] xor A[5] xor A[7],
B[7]=A[0] xor A[3] xor A[6] xor A[7].

In accordance with another aspect of the present invention, there is provided a block cipher ARIA substitution apparatus, the apparatus including: an Sbox operation unit for performing operations of substitution boxes $S_1$, $S_1^{-1}$, $S_2$, $S_2^{-1}$; and a control unit for determining an operation mode of the Sbox operation unit.

The Sbox operation unit may include: a first inverse affine transformation unit for performing an inverse affine operation for obtaining an inverse substitution box $S_1^{-1}$ with respect to an input value; a second inverse affine transformation unit w for performing an inverse affine operation for obtaining an inverse substitution box $S_2^{-1}$ with respect to the input value; a finite field inverse element operation unit for computing an inverse element of $GF(2^8)$ with respect to the input value or a result value of the first inverse affine transformation unit, which is multiplexed with the input value, or for computing an inverse element of $GF(2^8)$ with respect to the input value or a result value of the second inverse affine transformation unit, which is multiplexed with the input value; a first affine transformation unit for performing an affine operation for obtaining a substitution box $S_1$ with respect to a result value of the finite field inverse element operation unit; a second affine transformation unit for performing an affine operation for obtaining a substitution box $S_2$ with respect to a result value of the finite field inverse element operation unit; a first multiplexer for determining an input of the finite field inverse element operation unit under control of the control unit; and a second multiplexer which selects any one of the output value of the first affine transformation unit, the output value of the second affine transformation unit or the result value of the finite field inverse element operation unit as the result value of the Sbox operation unit under the control of the control unit.

In accordance with still another aspect of the present invention, there is provided a block cipher ARIA substitution method in a block cipher ARIA substitution apparatus including a first Sbox operation unit, a second Sbox operation unit and a control unit for determining operation modes of the operation units, the method including: performing a finite field inverse element operation with respect to an input value, in an S1 operation mode of the first Sbox operation unit; performing first affine transformation with respect to a result value of the finite field inverse element operation and outputting a result value thereof; and outputting a result value of the first affine transformation as a result value of $S_1$.

Preferably, the performing the finite field inverse element operation may include, in an $S_1^{-1}$ operation mode of the first Sbox operation unit, performing first inverse affine transformation with respect to the input value; performing a finite field inverse element operation with respect to a result value of the first inverse Affine transformation; and outputting a result value of the finite field inverse element operation as a result value of $S_1^{-1}$.

In accordance with still another aspect of the present invention, there is provided a block cipher ARIA substitution method in a block cipher ARIA substitution apparatus including a first Sbox operation unit, a second Sbox operation unit and a control unit for determining operation modes of the operation units, the method including: performing a finite field inverse element operation with respect to an input value, in an $S_2$ operation mode of the second Sbox operation unit; performing second affine transformation with respect to a result value of the finite field inverse element operation and outputting a result value thereof; and outputting a result value of the second affine transformation as a result value of $S_2$.

Further, the performing a finite field inverse element operation may include, in an $S_2^{-1}$ operation mode of the second Sbox operation unit, performing second inverse affine transformation with respect to the input value; performing a finite field inverse element operation with respect to a result value of the second inverse Affine transformation; and outputting a result value of the finite field inverse element operation as a result value of $S_2^{-1}$.

The present invention has an advantage of reducing the size of hardware of an ARIA encryption apparatus by implementing a block cipher ARIA substitution operation via a finite field operation without a specific ROM and/or RAM, in a block cipher ARIA substitution apparatus and method The present invention has another advantage of performing a high-speed ARIA operation by implementing a substitution box by an operation logic such that a pipe line method is applicable, in the block cipher ARIA substitution apparatus and method.

BRIEF DESCRIPTION OF THE DRAWINGS

The above and other objects and features of the present invention will become apparent from the following description of embodiments, given in conjunction with the accompanying drawings, in which:

FIG. 5A is a view showing a detailed configuration of a first affine transformation unit in accordance with an embodiment of the present invention;

FIG. 5B is a view showing a detailed configuration of a first affine transformation unit in accordance with an embodiment of the present invention;

FIG. 7A is a view showing a detailed configuration of a second affine transformation unit in accordance with an embodiment of the present invention;

FIG. 7B is a view showing a detailed configuration of a second affine transformation unit in accordance with an embodiment of the present invention;

DETAILED DESCRIPTION OF THE EMBODIMENTS

Hereinafter, the operation principle of the present invention will be described in detail with reference to the accompanying drawings. In describing the present invention, if it is determined that the detailed description of a related known function or construction renders the scope of the present invention unnecessarily ambiguous, the detailed description thereof will be omitted. Meaning of terminology used herein should be determined in consideration of functionality of the present invention, and it may be variable depending on user's or operator's intention, or customs in the art. Therefore, corresponding meaning should be determined with reference to the entire pages of the specification.

In accordance with the present invention, it is possible to reduce the size of hardware of an ARIA encryption apparatus by implementing a block cipher ARIA substitution operation via a finite field operation without a specific ROM and/or RAM and to perform a high-speed ARIA operation by implementing a substitution box by an operation logic such that a pipe line method is applicable.

Figure 1:
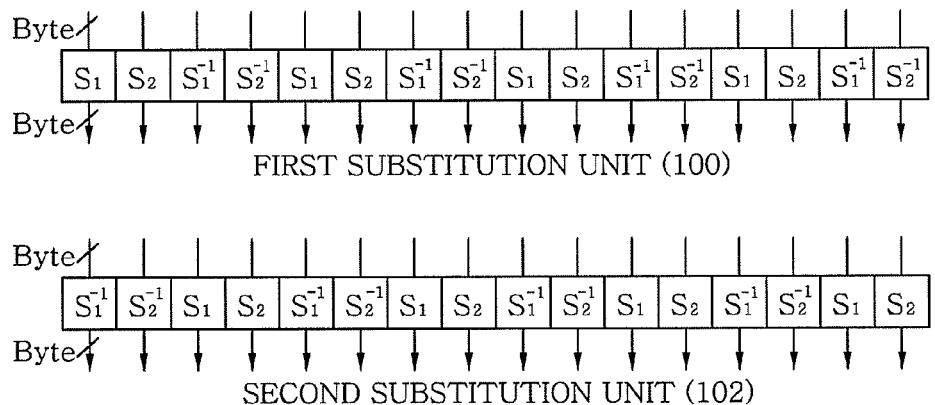
FIG. 1 is a view showing a conventional substitution unit.
Figure 2:
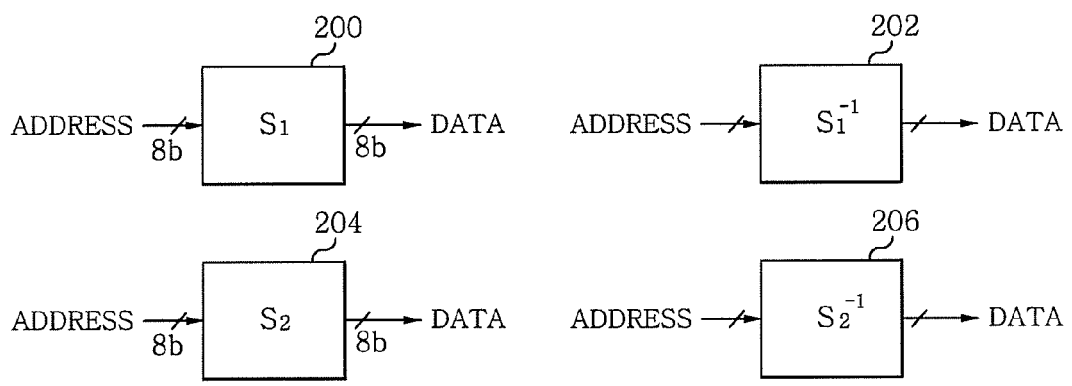
FIG. 2 is a view showing a configuration of conventional substitution boxes.
Figure 3:
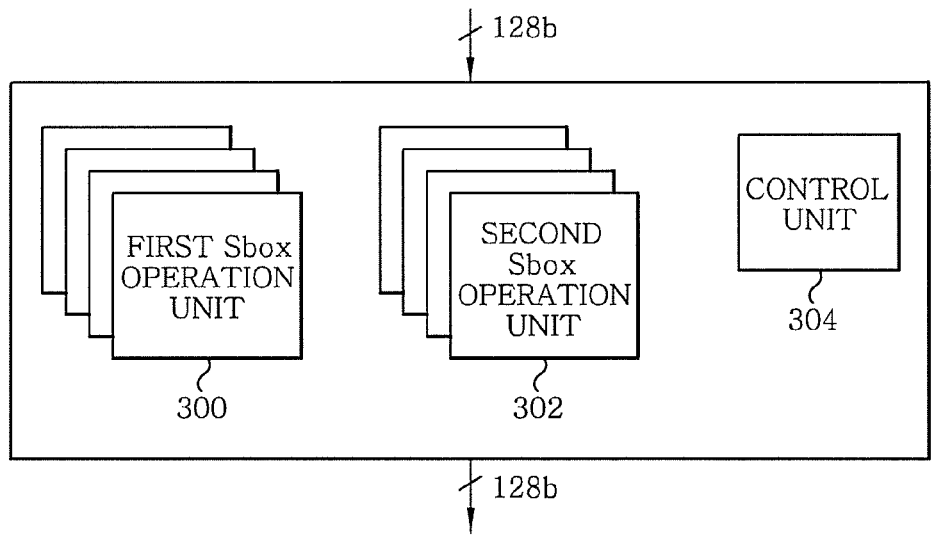
FIG. 3 is a view showing a configuration of a block cipher ARIA substitution apparatus in accordance with an embodiment of the present invention.

FIG. 3 is a view showing the configuration of a block cipher ARIA substitution apparatus in accordance with an embodiment of the present invention.

Referring to FIG. 3, the block cipher ARIA substitution apparatus of the present invention includes a first Sbox operation unit 300 for performing operations of a substitution box $S_1$ and a substitution box $S_1^{-1}$, a second Sbox operation unit 302 for performing operations of a substitution box $S_2$ and a substitution box $S_2^{-1}$, and a control unit for determining modes of the first Sbox operation unit 300 and the second Sbox operation unit 302, and thereby performs a block cipher ARIA operation without using a separate ROM and/or RAM for implementing the substitution box, in computation of a 128-bit output for a 128-bit input.

That is, the first Sbox operation unit 300 and the second Sbox operation unit 302 implement four types substitution boxes using a finite field operation logic without using the separate ROM or RAM. In particular, the first Sbox operation unit 300 implements both the substitution boxes $S_1$ and $S_1^{-1}$ and the second Sbox operation unit 302 implements both the substitution boxes $S_2$ and $S_2^{-1}$ such that the four types of substitution boxes are implemented by two types of Sbox operation units.

Accordingly, the substitution boxes $S_1$ and $S_1^{-1}$ are implemented by one Sbox operation unit (first Sbox operation unit) 300 and the substitution boxes $S_2$ and $S_2^{-1}$ are implemented by one Sbox operation unit (second Sbox operation unit) 302 such that the size of hardware can be reduced.

Here, a method of implementing the substitution box by the finite field operation without using the separate ROM and/or RAM is distinguished by the substitution boxes $S_1$ and $S_2$ and the inverse substitution boxes $S_1^{-1}$ and $S_2^{-1}$. That is, in the method for implementing the substitution boxes, with respect to an 8-bit input value, an inverse element of $GF(2^8)$ is obtained and affine transformation in accordance with a substitution box form is then performed. In the method for implementing the inverse substitution boxes, with respect to the 8-bit input value, affine transformation in accordance with a substitution box form is performed and an inverse element of $GF(2^8)$ is then obtained.

Figure 4:
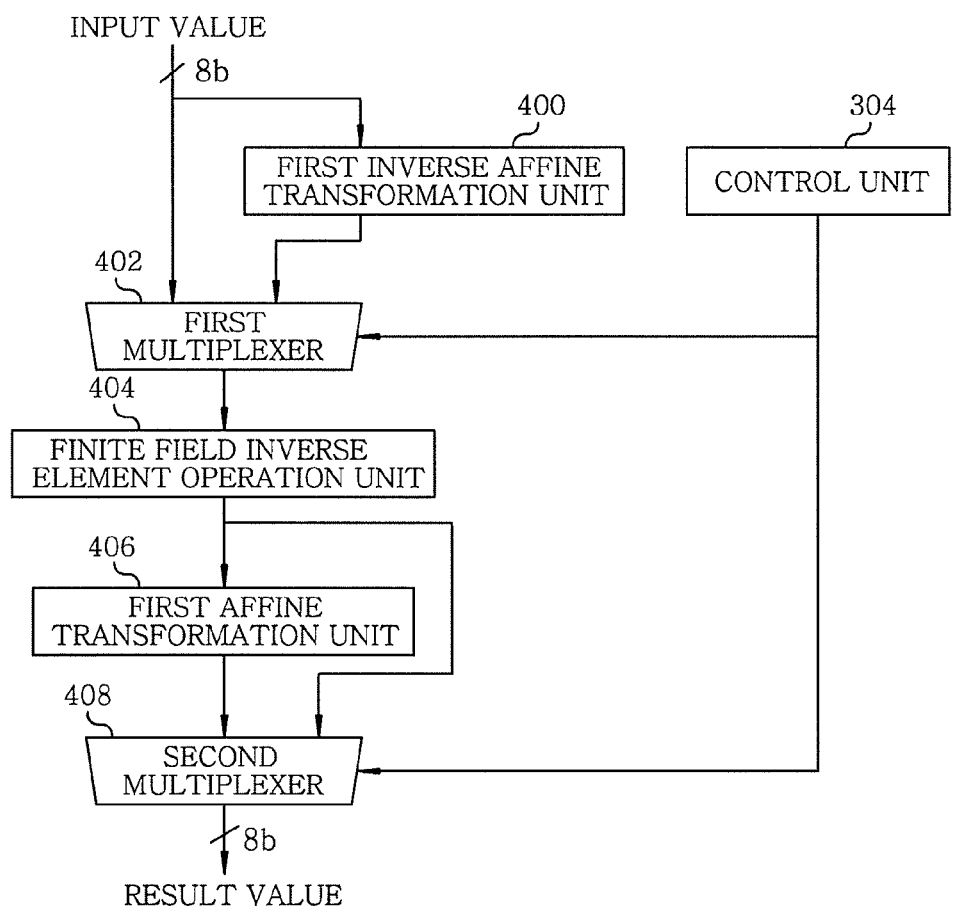
FIG. 4 is a view showing a detailed configuration of a first Sbox operation unit in accordance with an embodiment of the present invention.

FIG. 4 shows a logic circuit of the first Sbox operation unit 300 shown in FIG. 3 in detail. Hereinafter, the operation of the logic circuit of the first Sbox operation unit 300 will be described in detail with respect to FIG. 4.

First, a first affine transformation unit 406 performs affine transformation for obtaining the substitution box $S_1$ with respect to the 8-bit input value. A first inverse affine transformation unit 400 performs inverse affine transformation for obtaining the substitution box $S_1^{-1}$ with respect to the 8-bit input value.

A finite field inverse element operation unit 404 computes the inverse element of $GF(2^8)$ of the 8-bit input value or computes the inverse element of $GF(2^8)$ of the result value of the first inverse affine transformation unit 400 multiplexed with the 8-bit input value. Here, the finite field inverse element operation unit 404 is composed of finite field inverse element operation logic for an irreducible polynomial $m(x)= x^8+x^4+x^3+x+1$ which is employed in the block cipher ARIA.

A first multiplexer 402 determines an input of the finite field inverse element operation unit 404 under the control of the control unit 304. A second multiplexer 408 selects any one of the output value of the first affine transformation unit 406 and the result value of the finite field inverse element operation unit 404 as the result value of the first Sbox operation unit 300 under the control of the control unit 304. The control unit 304 generates a selection control signal of the first multiplexer 402 and the second multiplexer 408, and controls the selection operations of the first multiplexer 402 and the second multiplexer 408.

FIG. 5A is a view showing a detailed operation process of the first affine transformation unit 406 for performing the affine transformation in order to obtain $S_1$, and FIG. 5B is a view showing a detailed operation process of the first inverse affine transformation unit 400 for performing the inverse affine transformation in order to obtain $S_1^{-1}$.

In the affine transformation process and the inverse affine transformation process, an input value A is composed of A[0] to A[7] which indicate one byte. A[0] indicates a least significant bit and A[7] indicates a most significant bit. An output value B is composed of B[0] to B[7] which indicate one byte. B[0] indicates a least significant bit and B[7] indicates a most significant bit.

Figure 6:
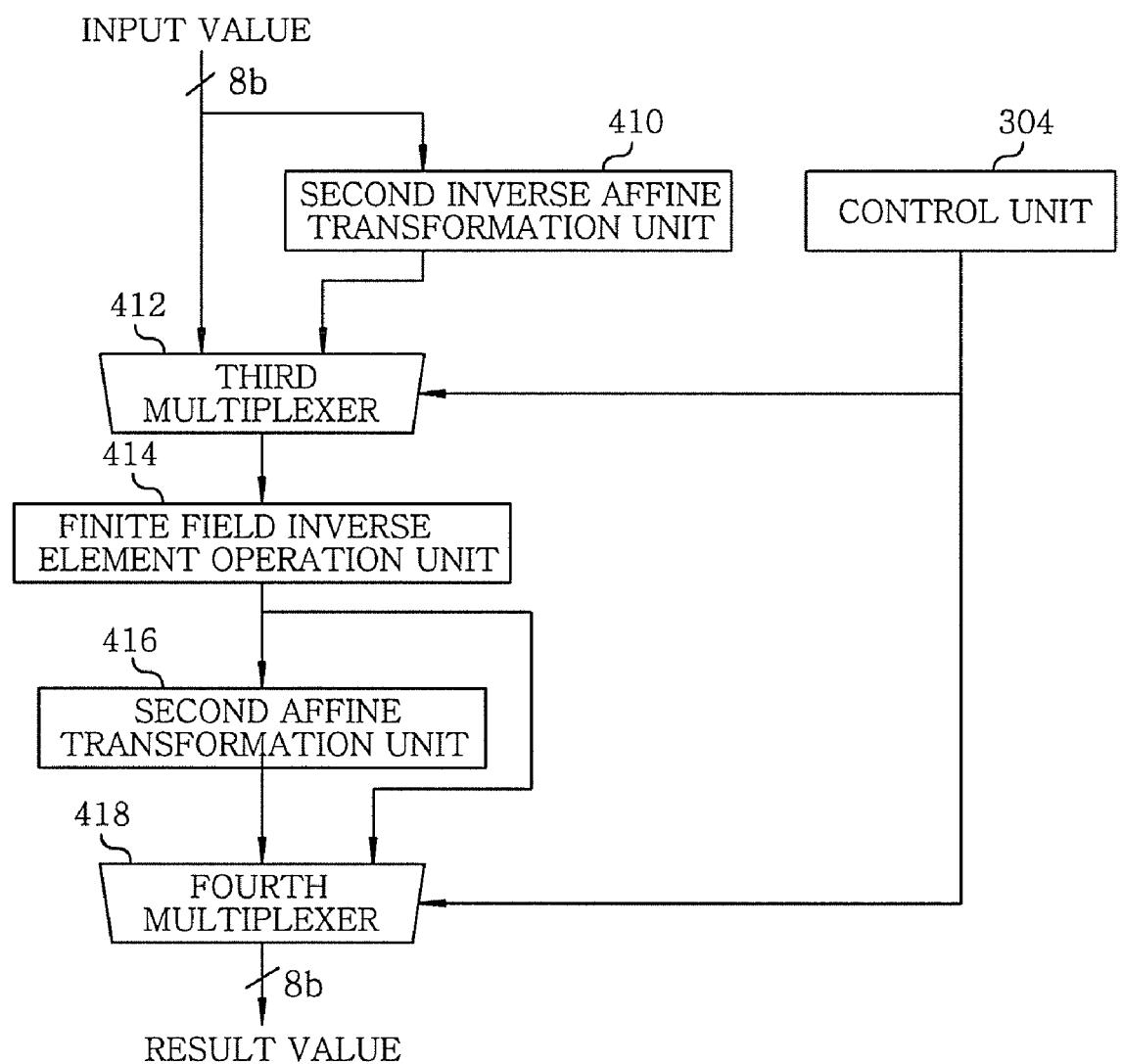
FIG. 6 is a view showing a detailed configuration of a second Sbox operation unit in accordance with an embodiment of the present invention.

FIG. 6 shows a logic circuit of the second Sbox operation unit 302 shown in FIG. 3 in detail. Hereinafter, the operation of the logic circuit of the second Sbox operation unit 302 will be described in detail with respect to FIG. 6.

First, a second affine transformation unit 416 performs affine transformation on the 8-bit input value to obtain the substitution box $S_2$. A second inverse affine transformation unit 410 performs inverse affine transformation on the 8-bit input value to obtain the substitution box $S_2^{-1}$.

A finite field inverse element operation unit 414 computes the inverse element of $GF(2^8)$ of the 8-bit input value, or computes the inverse element of $GF(2^8)$ of the result value of the second inverse affine transformation unit 410 multiplexed with the 8-bit input value. Here, the finite field inverse element operation unit 414 is composed of finite field inverse element operation logic for an irreducible polynomial $m(x)=x^8+x^4+x^3+x+1$ which is employed in the block cipher ARIA.

A third multiplexer 412 determines an input of the finite field inverse element operation unit 414 under the control of the control unit 304. A fourth multiplexer 418 selects any one of the output value of the second affine transformation unit 416 and the result value of the finite field inverse element operation unit 414 as the result value of the second Sbox operation unit 302 under the control of the control unit 304. The control unit 304 generates a selection control signal for the third multiplexer 412 and the fourth multiplexer 418, and thereby controls the selection operations of the third multiplexer 412 and the fourth multiplexer 418.

FIG. 7A is a view showing a detailed operation process of the second affine transformation unit 416 for performing the affine transformation in order to obtain $S_2$, and FIG. 7B is a view showing a detailed operation process of the second inverse affine transformation unit 410 for performing the inverse affine transformation in order to obtain $S_2^{-1}$.

In the affine transformation process and the inverse affine transformation process, an input value A is composed of A[0] to A[7] which indicate one byte. A[0] indicates a least significant bit and A[7] indicates a most significant bit. An output value B is composed of B[0] to B[7] which indicate one byte. B[0] indicates a least significant bit and B[7] indicates a most significant bit.

Figure 8:
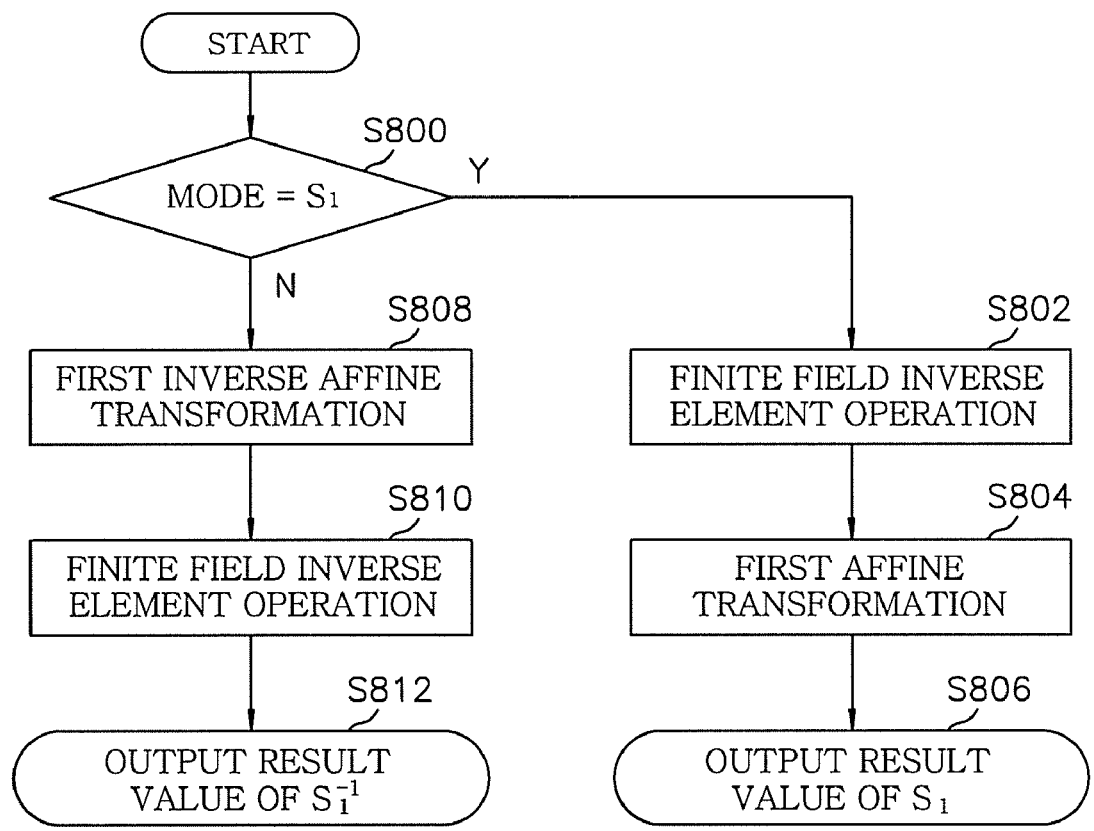
FIG. 8 is a flowchart illustrating an operation of the first Sbox operation unit in accordance with an embodiment of the present invention.

FIG. 8 is a flowchart illustrating a detailed operation of the first Sbox operation unit 300. Hereinafter, a method of computing the result values of $S_1$ and $S_1^{-1}$ with respect to an input value will be described with reference to FIGS. 3, 4, 5A and 5B.

First, when the control unit 304 sets a mode for allowing the first Sbox operation unit 300 to perform the affine operation in order to obtain $S_1$ (S800), the finite field inverse element operation unit 404 performs the finite field inverse element operation on the input value (S802). Subsequently, the first affine transformation unit 406 performs the first affine transformation on the result value of the inverse element operation of the finite field inverse element operation unit 404, and outputs the result value thereof (S804). Then, the second multiplexer 408 outputs the result value output from the first affine transformation unit 406 as the result value of $S_1$ under the control of the control unit 304 (S806).

In contrast, when the control unit 304 sets a mode for allowing the first Sbox operation unit 300 to perform the inverse affine operation in order to obtain $S_1^{-1}$ (S800), the first inverse affine transformation unit 400 performs the first inverse affine transformation on the input value (S808). Subsequently, the finite field inverse element operation unit 404 performs the finite inverse element operation on a result value obtained by multiplexing the input value and the result value from the first inverse affine transformation unit 400 (S810). Then the second multiplexer 408 outputs the result value output from the finite field inverse element operation unit 404 as the result value of $S_1^{-1}$ under the control of the control unit 304 (S812).

Figure 9:
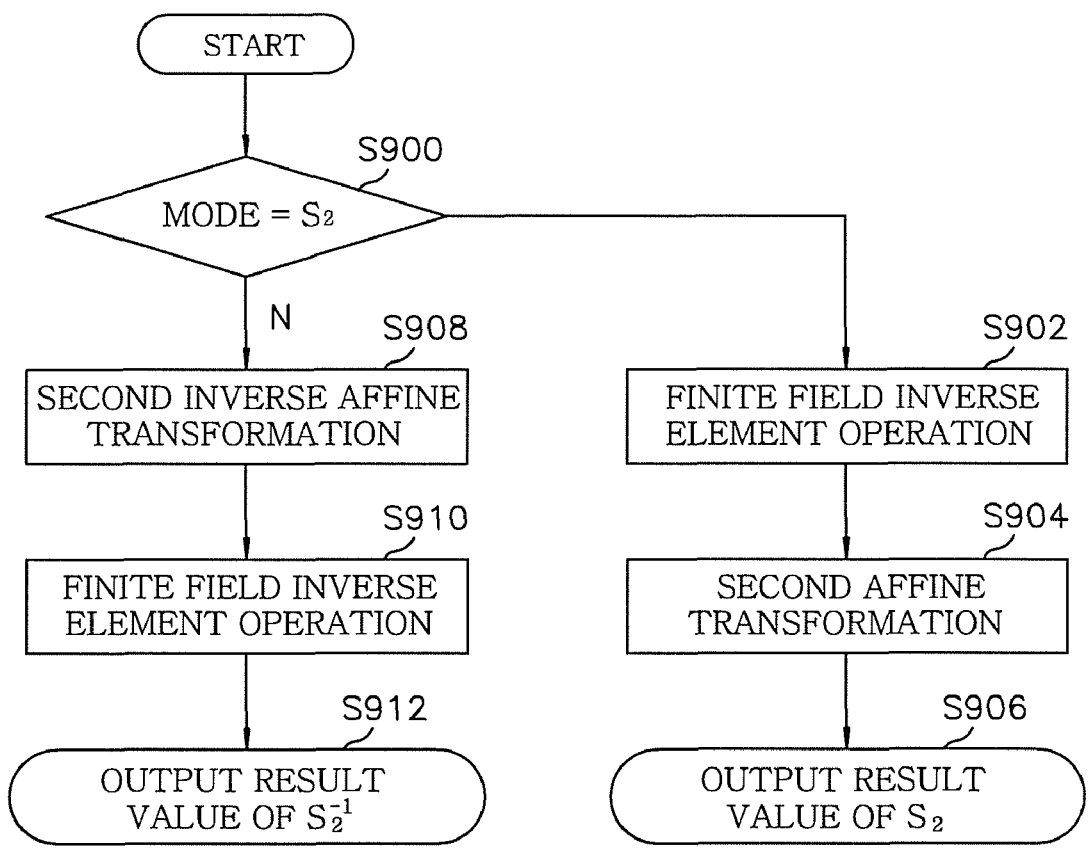
FIG. 9 is a flowchart illustrating an operation of the second Sbox operation unit in accordance with an embodiment of the present invention.

FIG. 9 is a flowchart illustrating a detailed operation of the second Sbox operation unit 302. Hereinafter, a method of computing the result values of $S_2$ and $S_2^{-1}$ with respect to an input value will be described with reference to FIGS. 3, 6, 7A and 7B.

First, when the control unit 304 sets a mode for allowing the second Sbox operation unit 302 to perform the affine operation in order to obtain S2 (S900), the finite field inverse element operation unit 414 performs the finite field inverse element operation on the input value (S902). Subsequently, the second affine transformation unit 416 performs the second affine transformation on the result value of the inverse element operation of the finite field inverse element operation unit 414, and outputs the result value thereof (S904). Then, the fourth multiplexer 418 outputs the result value output from the second affine transformation unit 416 as the result value of $S_2$ under the control of the control unit 304 (S906).

In contrast, when the control unit 304 sets a mode for allowing the second Sbox operation unit 302 to perform the inverse affine operation in order to obtain $S_2^{-1}$ (S900), the second inverse affine transformation unit 410 performs the second inverse affine transformation on the input value (S908). Subsequently, the finite field inverse element operation unit 414 performs the finite inverse element operation on the result value obtained by multiplexing the input value and the result value from the second inverse affine transformation unit 410 (S910). Then, the fourth multiplexer 418 outputs the result value output from the finite field inverse element operation unit 414 as the result value of $S_2^{-1}$ under the control of the control unit 304 (S912).

Figure 10:
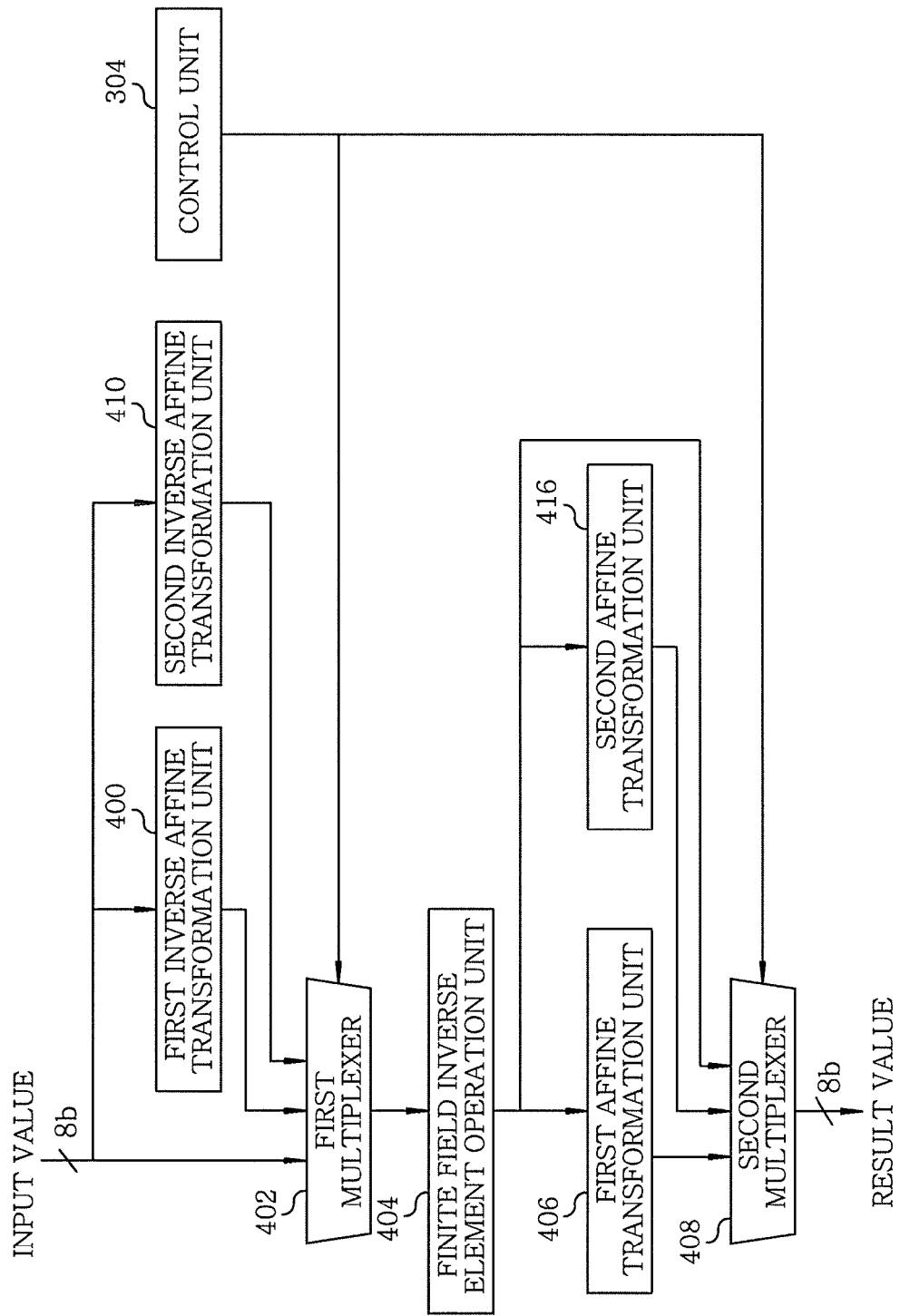
FIG. 10 is a view showing the detailed configuration of a Sbox operation unit which commonly implements the first Sbox operation unit and the second Sbox operation unit in accordance with an embodiment of the present invention.

FIG. 10 is a view showing the detailed configuration of a logic circuit of a Sbox operation unit which commonly implements the first Sbox operation unit 300 and the second Sbox operation unit 302 shown in FIG. 3. Hereinafter, the operation of the logic circuit of the Sbox operation unit will be described in detail with reference to FIG. 10.

First, the first affine transformation unit 406 performs the affine operation to obtain the substitution box $S_1$ with respect to the 8-bit input value. The first inverse affine transformation unit 400 performs the inverse affine operation to obtain the substitution box $S_1^{-1}$ with respect to the 8-bit input value. The second affine transformation unit 416 performs the affine operation to obtain the substitution box $S_2$ with respect to the 8-bit input value. The second inverse affine transformation unit 410 performs the inverse affine operation to obtain the substitution box $S_2^{-1}$ with respect to the 8-bit input value.

A finite field inverse element operation unit 500 computes an inverse element of $GF(2^8)$ of the 8-bit input value, an inverse element of $GF(2^8)$ of the result value of the first inverse affine transformation unit 400, which is multiplexed with the 8-bit input value, or an inverse element of $GF(2^8)$ of the result value of the second inverse affine transformation unit 410, which is multiplexed with the 8-bit input value.

The first multiplexer 402 determines an input of the finite field inverse element operation unit 500 under the control of the control unit 304. The second multiplexer 408 selects any one of the output value of the first affine transformation unit 406, the output value of the second affine transformation unit 416 or the result value of the finite field inverse element operation unit 500 as the result value of the Sbox operation unit under the control of the control unit 304. The control unit 304 generates a selection control signal of the first multiplexer 402 and the second multiplexer 408, and controls the selection operations of the first multiplexer 402 and the second multiplexer 408.

In particular, the Sbox operation unit of FIG. 10 simultaneously implements the first Sbox operation unit 300 and the second Sbox operation unit 302 of FIG. 3 in order to decrease the size of the hardware. If the substation unit is composed of the Sbox operation unit shown in FIG. 10, one Sbox operation unit is repeatedly operated. Thus, the size of the hardware is reduced.

As described above, with a block cipher ARIA substitution apparatus and method of the present invention, the size of the hardware can be reduced by implementing a block cipher ARIA substitution operation via a finite field operation without a specific ROM and/or RAM, and a high-speed ARIA operation can be performed by implementing a substitution box by an operation logic such that a pipe line method is applicable.

While the invention has been shown and described with respect to the embodiments, it will be understood by those skilled in the art that various changes and modifications may be made without departing from the scope of the invention as defined in the following claims.

What is claimed is:

1. A block cipher Academy, Research Institute and Agency (ARIA) substitution apparatus, the apparatus comprising:
    an Sbox operation unit for performing operations of substitution boxes $S_1$, $S_1^{-1}$, $S_2$, and $S_2^{-1}$, the Sbox operation unit comprising:
        a first inverse affine transformation unit coupled to receive an input value, the first inverse affine transformation unit configured to perform an inverse affine operation for obtaining an inverse substitution box $S_1^{-1}$ with respect to the input value;
        a second inverse affine transformation unit coupled to receive the input value, the second inverse affine transformation unit configured to perform an inverse affine operation for obtaining an inverse substitution box $S_2^{-1}$ with respect to the input value;
        a finite field inverse element operation unit configured to:
            compute an inverse element of $GF(2^8)$ with respect to the input value in an $S_1$ operation mode or in an $S_2$ operation mode, compute an inverse element of $GF(2^8)$ with respect to a value of a result value of the first inverse affine transformation unit in an $S_1^{-1}$ operation mode, and
            computing an inverse element of $GF(2^8)$ with respect to the input value or a result value of the second inverse affine transformation unit in an $S_2^{-1}$ mode,
        a first affine transformation unit configured to perform an affine operation for obtaining a substitution box $S_1$ with respect to a result value of the finite field inverse element operation unit;
        a second affine transformation unit configured to perform an affine operation for obtaining a substitution box $S_2$ with respect to a result value of the finite field inverse element operation unit;
        a first multiplexer configured to determine an input of the finite field inverse element operation unit under control of the control unit; and
        a second multiplexer configured to select any one of the output value of the first affine transformation unit, the output value of the second affine transformation unit or the result value of the finite field inverse element operation unit as the result value of the Sbox operation unit under the control of the control unit; and
    a control unit coupled to the Sbox operation unit and configured to set an operation mode of the Sbox operation unit to one of the $S_1$ operation mode, the $S_1^{-1}$ operation mode, the $S_2$ operation mode, and the $S_2^{-1}$ operation mode.

2. The apparatus of claim 1, wherein the finite field inverse element operation unit has a finite field inverse element operation logic for an irreducible polynomial m(x) expressed by a following equation, $$m(x)=x^8+x^4+x^3+x+1.$$

3. The apparatus of claim 1, wherein the first affine transformation unit outputs output values B[0] to B[7] satisfying a following equation with respect to input values A[0] to A[7],
B[0]=A[0] xor A[4] xor A[5] xor A[6] xor A[7] xor '1',
B[1]=A[1] xor A[5] xor A[6] xor A[7] xor A[0] xor '1',
B[2]=A[2] xor A[6] xor A[7] xor A[0] xor A[1],
B[3]=A[3] xor A[7] xor A[0] xor A[1] xor A[2],
B[4]=A[4] xor A[0] xor A[1] xor A[2] xor A[3],
B[5]=A[5] xor A[1] xor A[2] xor A[3] xor A[4] xor '1',
B[6]=A[6] xor A[2] xor A[3] xor A[4] xor A[5] xor '1',
B[7]=A[7] xor A[3] xor A[4] xor A[5] xor A[6].

4. The apparatus of claim 1, wherein the first inverse affine transformation unit outputs output values B[0] to B[7] satisfying a following equation with respect to input values A[0] to A[7],
B[0]=A[2] xor A[5] xor A[7] xor '1',
B[1]=A[0] xor A[3] xor A[6],
B[2]=A[1] xor A[4] xor A[7] xor '1',
B[3]=A[0] xor A[2] xor A[5],
B[4]=A[1] xor A[3] xor A[6],
B[5]=A[2] xor A[4] xor A[7],
B[6]=A[0] xor A[3] xor A[5],
B[7]=A[1] xor A[4] xor A[6].

5. The apparatus of claim 1, wherein the second affine transformation unit outputs output values B[0] to B[7] satisfying a following equation with respect to input values A[0] to A[7],
B[0]=A[1] xor A[3] xor A[5] xor A[6] xor A[7],
B[1]=A[2] xor A[3] xor A[4] xor A[5] xor A[6] xor A[7] xor '1',
B[2]=A[0] xor A[1] xor A[2] xor A[4] xor A[5] xor A[7],
B[3]=A[0] xor A[1] xor A[6] xor A[7],
B[4]=A[1] xor A[6] xor A[7],
B[5]=A[0] xor A[1] xor A[4] xor A[5] xor A[6] xor '1',
B[6]=A[1] xor A[2] xor A[6] xor A[7] xor '1',
B[7]=A[0] xor A[1] xor A[2] xor A[3] xor A[5] xor A[6] xor '1'.

6. The apparatus of claim 1, wherein the second inverse affine transformation unit outputs output values B[0] to B[7] satisfying a following equation with respect to input values A[0] to A[7], B[0]=A[3] xor A[4],
B[1]=A[2] xor A[5] xor A[6],
B[2]=A[4] xor A[6] xor 1'b1,
B[3]=A[0] xor A[1] xor A[2] xor A[6] xor A[7] xor '1',
B[4]=A[0] xor A[1] xor A[2] xor A[4] xor A[5],
B[5]=A[1] xor A[2] xor A[4] xor A[6] xor A[7] xor '1',
B[6]=A[0] xor A[2] xor A[3] xor A[4] xor A[5] xor A[7],
B[7]=A[0] xor A[3] xor A[6] xor A[7].

* * * * *